United States Patent
Matsumoto et al.

(10) Patent No.: US 6,508,414 B2
(45) Date of Patent: Jan. 21, 2003

(54) WINDOW WASHER NOZZLE AND MOLDING DEVICE FOR MOLDING THE SAME

(75) Inventors: Yasuhiro Matsumoto, Hamamatsu (JP); Naoki Tamano, Nagoya (JP)

(73) Assignees: Asmo Co., Ltd., Shizuoka (JP); Tamanokasei Co., Ltd., Nagoya (JP)

( * ) Notice: Subject to any disclaimer, the term of this patent is extended or adjusted under 35 U.S.C. 154(b) by 0 days.

(21) Appl. No.: 10/128,251

(22) Filed: Apr. 24, 2002

(65) Prior Publication Data

US 2002/0166901 A1 Nov. 14, 2002

(30) Foreign Application Priority Data

May 11, 2001 (JP) ......................................... 2001-142091

(51) Int. Cl.[7] ................. B05B 1/10; B60S 1/46
(52) U.S. Cl. ................. 239/284.1; 239/284.2; 239/569; 239/589; 239/575
(58) Field of Search .................. 239/284.1, 284.2, 239/569, 570, 571, 575, 589, 104; 15/250.02

(56) References Cited

U.S. PATENT DOCUMENTS

| | | | | |
|---|---|---|---|---|
| 2,793,912 A | * | 5/1957 | Krohm | 239/587.5 |
| 3,656,691 A | * | 4/1972 | Norstrand | 239/284.2 |
| 3,901,444 A | * | 8/1975 | Maltbie et al. | 239/112 |
| 6,113,006 A | * | 9/2000 | Walker et al. | 239/284.1 |
| 6,186,409 B1 | | 2/2001 | Srinath et al. | |
| 6,260,771 B1 | * | 7/2001 | Martin | 239/284.1 |

* cited by examiner

Primary Examiner—Robin O. Evans
(74) Attorney, Agent, or Firm—Law Offices of David G. Posz

(57) ABSTRACT

In a window washer nozzle of a window washer apparatus, washer liquid in a vertical liquid pipe is introduced into a horizontal liquid pipe through a filter and sprayed out from an orifice to a windshield. The filter is integrally molded in a coupling portion of the first and the second liquid pipes. An opposed wall of the filter is opposite to an inlet of the horizontal liquid pipe with a space L through which the washer liquid flows into the horizontal liquid pipe. The space L is smaller than a bore size W of the orifice. Therefore, foreign materials in the washer liquid larger than the bore size W are blocked at the filter, thereby restricting clogging of the orifice.

21 Claims, 10 Drawing Sheets

WINDOW WASHER NOZZLE AND MOLDING DEVICE FOR MOLDING THE SAME

CROSS REFERENCE TO RELATED APPLICATION

This application is based on Japanese Patent Application No. 2001-142091 filed on May 11, 2001, the disclosure of which is incorporated herein by reference.

FIELD OF THE INVENTION

The present invention relates to a window washer nozzle for spraying out washer liquid to a windshield and a nozzle molding device for molding the same.

BACKGROUND OF THE INVENTION

A window washer nozzle is generally mounted on a hood of a vehicle to wash a windshield. Washer liquid is pumped into the window washer nozzle from a washer tank through tubes. The window washer nozzle has a liquid pipe and a spraying (jet) orifice at an outlet of the liquid pipe. The washer liquid introduced in the liquid pipe is sprayed out to the windshield from the spraying orifice. In this kind of window washer nozzle, an inner diameter of the orifice is made smaller than an inner diameter of the liquid pipe to increase jet pressure of the washer liquid sprayed out from the orifice. As a result, the spraying orifice is likely to be clogged with foreign materials in the washer liquid.

SUMMARY OF THE INVENTION

It is an object of the present invention to provide a window washer nozzle in which clogging due to foreign materials and the like is restricted.

It is another object of the present invention to provide a nozzle molding device which is capable of integrally molding a nozzle having a filter with a simple molding unit.

According to the present invention, in a window washer nozzle spraying out washer liquid from a jet orifice for washing a windshield, a first liquid pipe extends in a substantially vertical direction, and a first end of a second liquid pipe is coupled to the first liquid pipe in a direction crossing to the first liquid pipe. A second end of the second liquid pipe defines a jet orifice with a dimension W. A filter is provided in a coupling portion of the first liquid pipe and the second liquid pipe. The filter is disposed to define a space L through which the washer liquid passes. The space L is made narrower than the dimension W of the jet orifice. The washer liquid introduced in the first liquid pipe is introduced into the second liquid pipe through the filter, and thereafter, the washer liquid is sprayed out from the jet orifice.

Since the space L of the filter is narrower than the dimension W, if foreign materials are contained in the washer liquid introduced into the first liquid pipe, the foreign materials larger than the dimension W are easily blocked at the filter. Only the foreign materials smaller than the dimension W reach the jet orifice and passes through the jet orifice. Therefore, clogging of the jet orifice due to foreign materials is restricted. Further, since the filter is provided at the coupling portion of the first and the second liquid pipes, the foreign materials blocked by the filter falls down in the first liquid pipe by gravity force. Accordingly, the foreign materials are hardly accumulated at the filter, and clogging of the filter is restricted.

When the window washer nozzle is used for a window washer apparatus for washing a windshield of a vehicle, washer liquid stored in a tank is pumped to the window washer nozzle by a pump provided in the tank. In this case, the window washer apparatus effectively washes the windshield while the clogging of the filter is restricted.

Exemplary, the filter is positioned at a bent portion where the second liquid pipe is bent from the first liquid pipe so that a current direction of the washer liquid is changed from the first liquid pipe into the second liquid pipe. Therefore, the washer liquid is introduced into the second liquid pipe from the first liquid pipe after being filtered at the bent portion.

The window washer nozzle can be easily molded by using a nozzle molding device of the present invention. In the nozzle molding device, a first pin for forming the first liquid pipe and a second pin for forming the second liquid pin are provided in a molding unit for forming an external form of the nozzle. At least one of the first pin and the second pin has a filer molding portion at an end which is coupled to one of the first pin and the second pin.

Since the filter molding portion is integrally provided in one of the first pin and the second pin, the nozzle having the filter therein is easily produced by the molding unit having a simple structure. Further, the shape of the filter is easily changed by changing at least one of the first pin and the second pin.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

First Embodiment

A window washer nozzle 10 of the first embodiment is described hereinafter with reference to FIGS. 1 to 7. In a window washer apparatus shown in FIG. 1, the window washer nozzle 10 is connected to a washer tank 4 mounted in an engine room (not shown) through tubes 2 and 3.

Figure 2A:
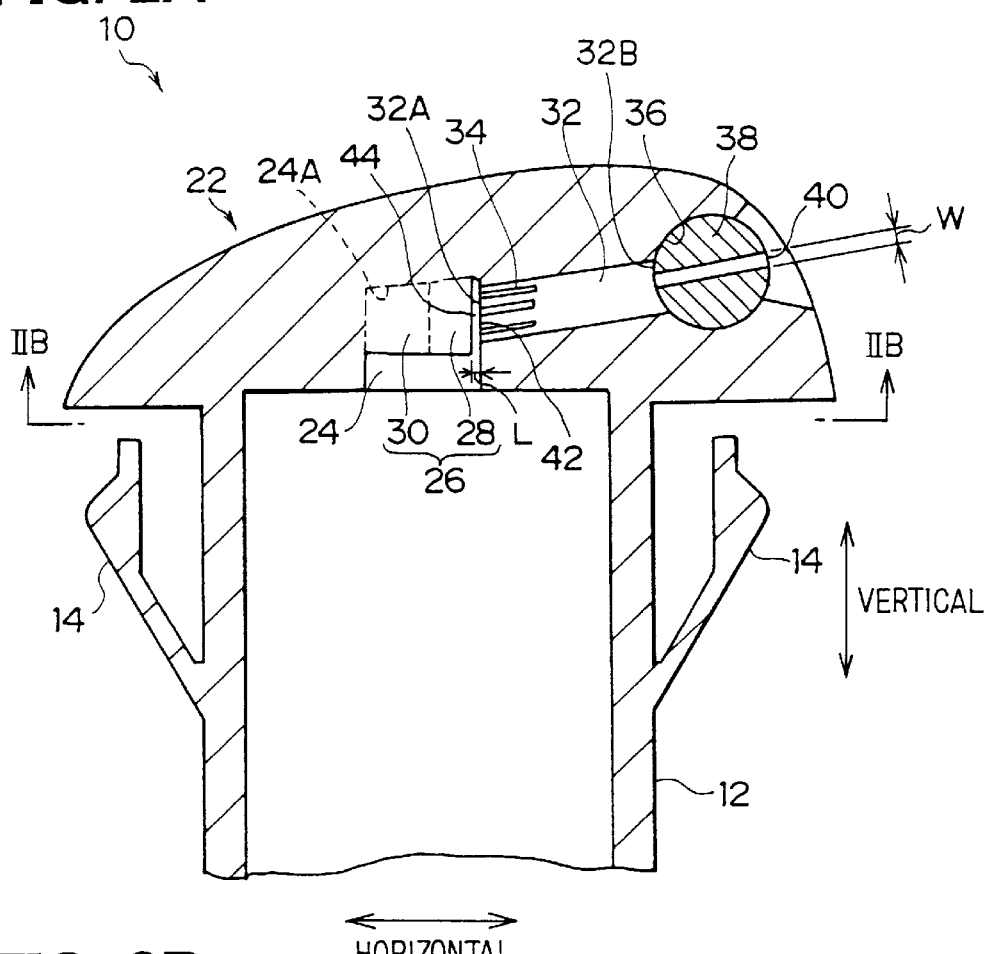
FIG. 2A is a vertical cross-sectional view of the window washer nozzle according to the first embodiment.

The window washer nozzle 10 has a cylindrical portion 12 that is substantially in a cylindrical shape at a lower part, as shown in FIG. 2A. The cylindrical portion 12 has a pair of hooks 14 on its outer cylindrical surface through which the window washer nozzle 10 is mounted on a hood (not shown) of a vehicle. The pair of hooks 14 protrudes upwardly (in FIG. 2A) from the outer cylindrical surface into a substantially L-shape.

Figure 1:
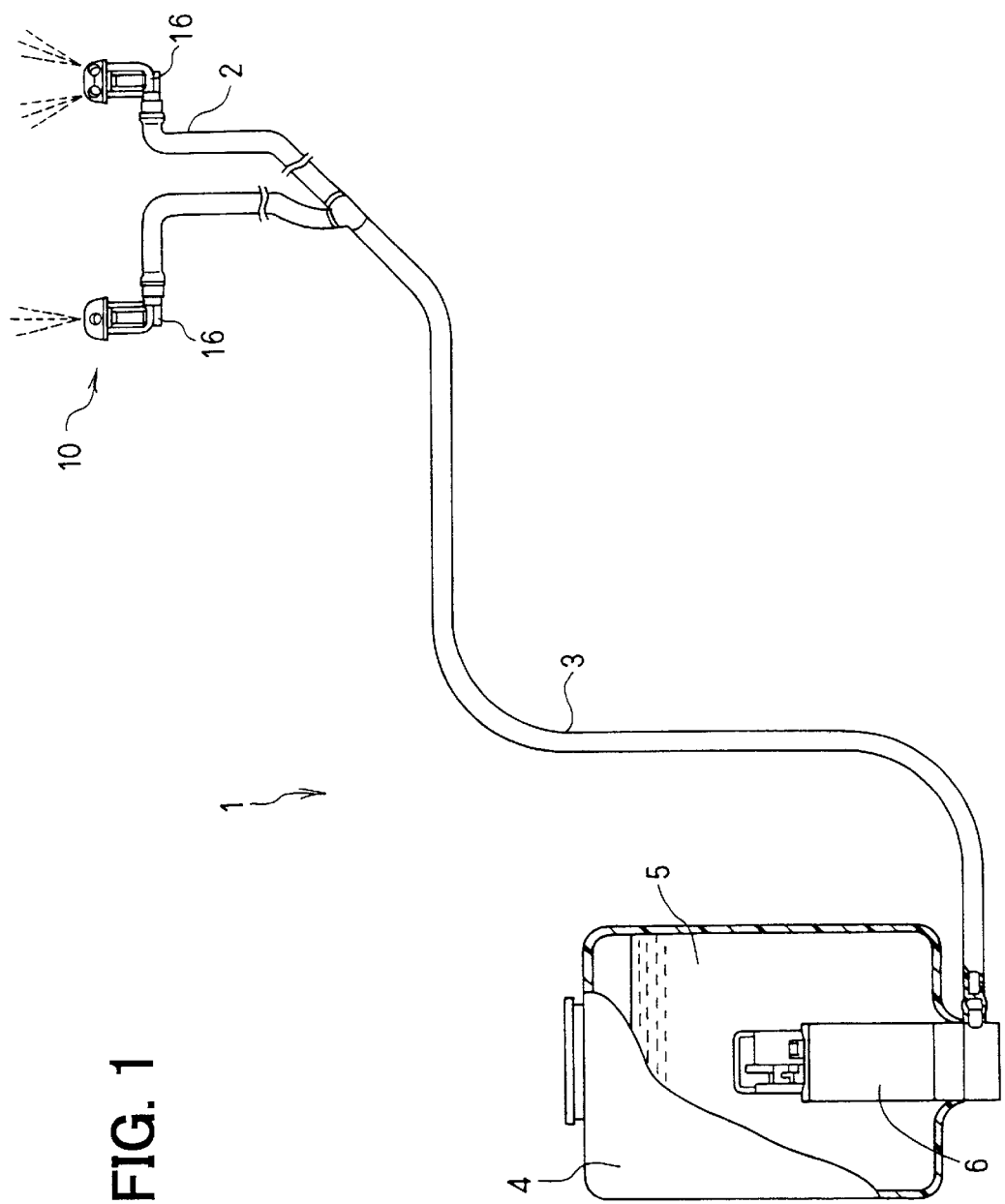
FIG. 1 is a schematic diagram of a window washer apparatus including a window washer nozzle according to the first embodiment of the present invention.
Figure 4:
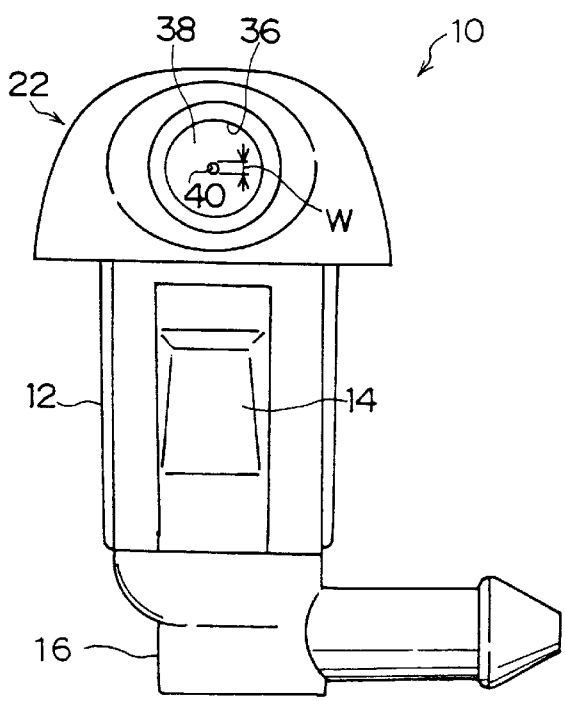
FIG. 4 is a front view of the window washer nozzle connected to a connecting pipe according to the first embodiment.

A connecting pipe 16 bent into a substantial L-shape is connected to a bottom end of the cylindrical portion 12, as shown in FIG. 4. The cylindrical portion 12 is communicated to the washer tank 4 through the connecting pipe 16 and tubes 2 and 3, as shown in FIG. 1. A washer pump 6 operated by a motor is provided in the washer tank 4, so washer liquid 5 in the tank 4 is pumped into the cylindrical portion 12 through the tubes 2 and 3 and the connecting pipe 16.

Figure 5:
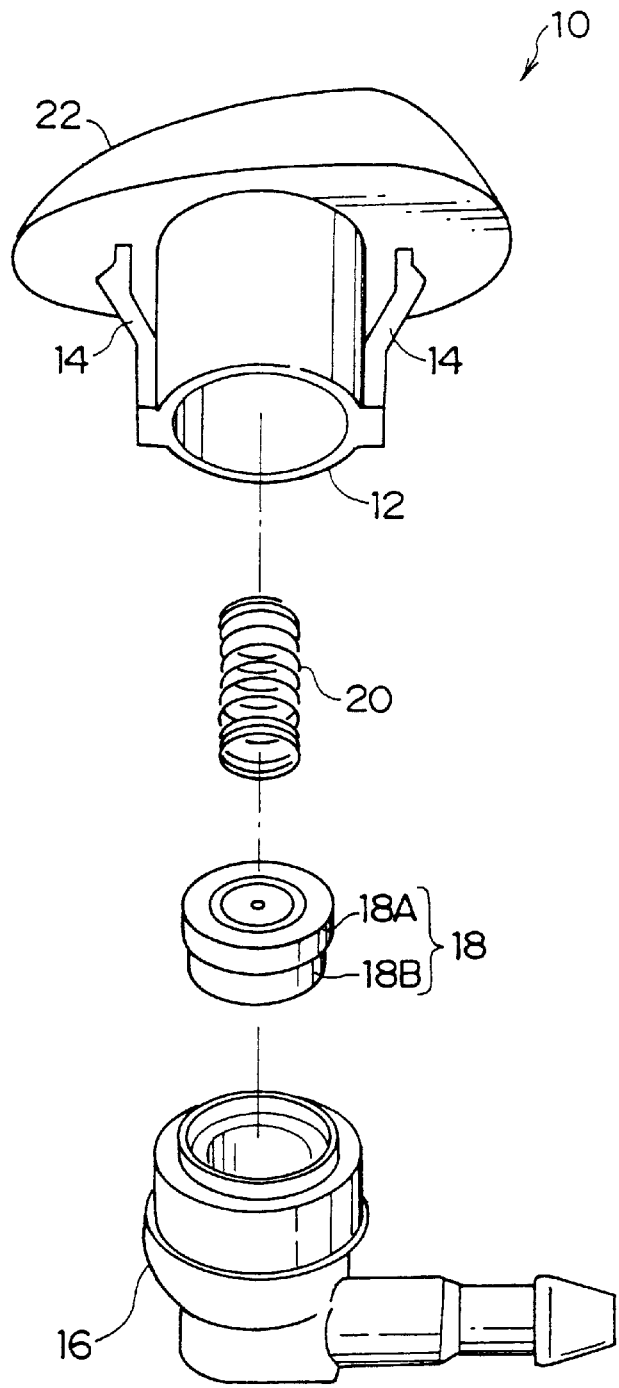
FIG. 5 is an exploded view of the window washer nozzle 10 in FIG. 4.

A check valve 18 having a substantially columnar shape is inserted in the cylindrical portion 12, as shown in FIG. 5. The check valve 18 includes a resin plate 18A on an upper side and a rubber valve 18B on a lower side. The check valve 18 is pressed to an outlet of the connecting pipe 16 by a compressed coil spring 20 fixed to a nozzle head 22 in the cylindrical portion 12. The check valve 18 permits the washer liquid 5 to flow into the cylindrical portion 12 from the connecting pipe 16, while restricting the washer liquid 5 from flowing backward from the cylindrical portion 12 into the connecting pipe 16. Further, the check valve 18 restricts an outside air from being drawn into the window washer nozzle 10 from an orifice (jet port) 40 when the washer liquid 5 is not jetted (sprayed). The tubes 2 and 3 are always filled with the washer liquid 5 to smoothly spray out the washer liquid 5. Also, the check valve 18 restricts the washer liquid in the tubes 2 and 3 from unintentionally leaking from the orifice 40 due to acceleration of a vehicle and the like.

The nozzle head 22 is integrally provided with the cylindrical portion 12 on the upper end of the cylindrical portion 12. The nozzle head 22 is formed into a semi-conical shape, and has a columnar vertical liquid pipe 24 in its center. The vertical liquid pipe 24 extends in a substantially vertical direction shown in FIG. 2A (in a gravitational direction). The vertical liquid pipe 24 is coupled to the cylindrical portion 12, so the washer liquid 5 introduced in the cylindrical portion 12 is introduced into the vertical liquid pipe 24.

A horizontal liquid pipe 32 having a substantially columnar shape is provided in the nozzle head 22. The horizontal liquid pipe 32 is coupled to the vertical liquid pipe 24 in a direction crossing to the vertical liquid pipe 24. The horizontal liquid pipe 32 extends generally in a horizontal direction and is coupled to the upper peripheral surface of the vertical liquid pipe 24. Preferably, the horizontal liquid pipe 32 extends slightly upwardly from the inlet 32A toward an outlet 32B. The horizontal liquid pipe 32 is inclined with respect to the horizontal direction, by an angle smaller than a predetermined angle. That is, the outlet 32B is located slightly higher than the inlet 32A.

Figure 2B:
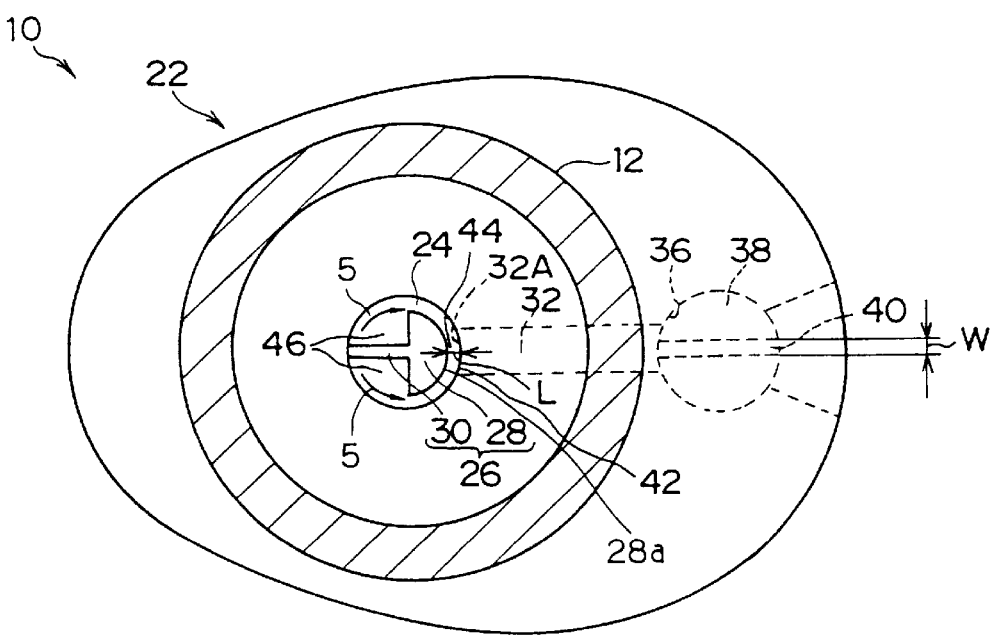
FIG. 2B is a cross-sectional view of the window washer nozzle taken along line IIB—IIB in FIG. 2A.
Figure 3:
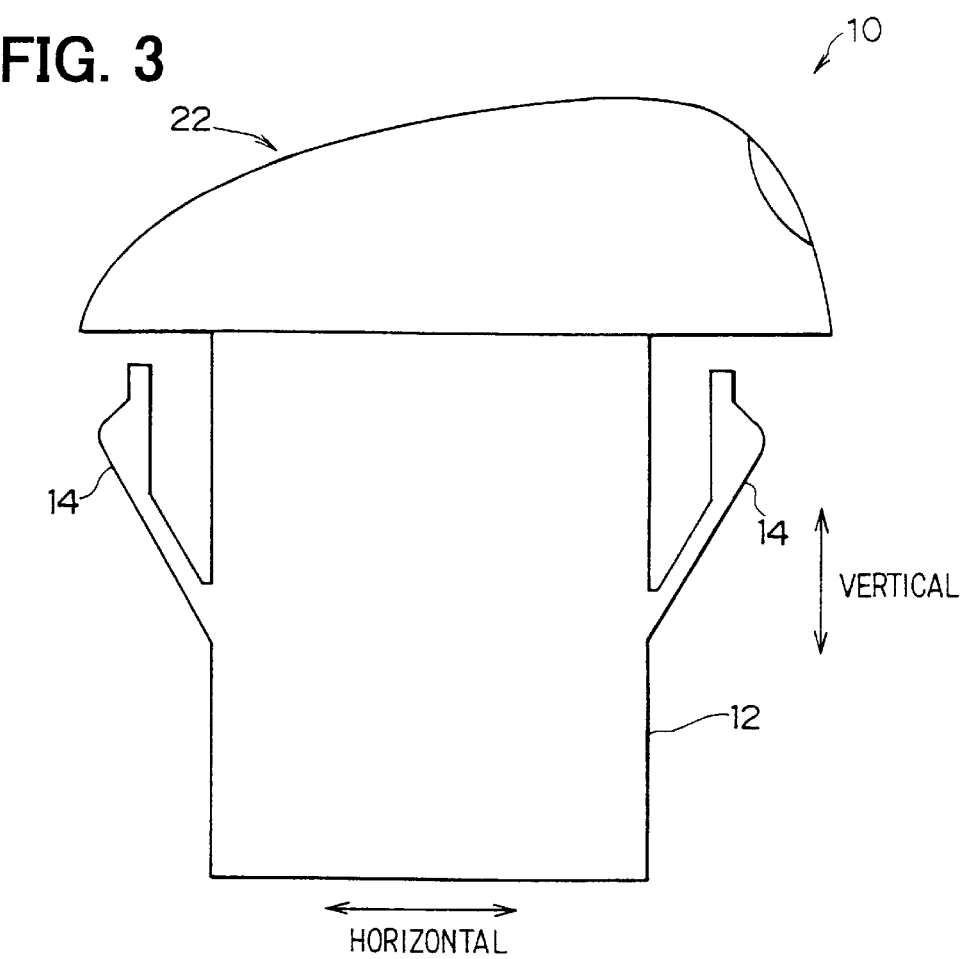
FIG. 3 is a side view of the window washer nozzle according to the first embodiment.

The liquid pipe (the vertical liquid pipe 24 and the horizontal liquid pipe 32) is bent at a coupling portion 42 where the vertical liquid pipe 24 is coupled to the horizontal liquid pipe 32. A filter 26 is integrally provided with the nozzle head 22 at the upper end of the vertical liquid pipe 24, that is, at the coupling portion 42. The filter 26 includes an opposed wall 28 in a semi-columnar shape and a plate-like connecting wall 30, as shown in FIG. 2B. The filter 26 has a substantially T-shape in its horizontal cross-section. The opposed wall 28 is positioned such that a curved surface 28a of the opposed wall 28 is opposite to the inlet 32A of the horizontal liquid pipe 32 with a space 44. The space 44 is uniformly defined between the curved surface 28A and the inlet 32A. A dimension (space) L of the space 44 is smaller than a dimension (bore size) W of the orifice 40. The opposed wall 28 is in contact with an upper wall 24A of the vertical liquid pipe 24. The connecting wall 30 is provided to contact the upper wall 24A, an inner peripheral wall of the vertical liquid pipe 24, and the opposed wall 28 other than a part opposite to the inlet 32A of the horizontal liquid pipe 32.

A predetermined number of current plates 34 is integrally molded with the nozzle head 22 to extend in a longitudinal direction of the horizontal liquid pipe 32, near the inlet 32A. Each of the current plates 34 extends substantially in the longitudinal direction of the horizontal liquid pipe 32 to regulate the flow of the washer liquid 5.

A spherical holding hole 36 is formed in the nozzle head 22 at the outlet 32B of the horizontal liquid pipe 32. A diameter of the holding hole 36 is greater than an inner diameter of the horizontal liquid pipe 32. The holding hole 36 is communicated to the outside of the nozzle head 22.

A spherical nozzle jet 38 made of iron is fitted in the nozzle hole 36. An outer diameter of the nozzle jet 38 is slightly smaller than the diameter of the holding hole 36 and greater than the inner diameter of the horizontal liquid pipe 32. Therefore, the nozzle jet 38 is restricted from entering the horizontal liquid pipe 32. The nozzle jet 38 is provided with the orifice (jet port) 40. Here, the bore size W of the orifice 40 is 0.8 mm, for example. The horizontal liquid pipe 32 is communicated to outside through the orifice 40. The washer liquid 5 introduced in the vertical liquid pipe 24 is filtered with the filter 26 and introduced into the horizontal liquid pipe 32 through the coupling portion 42. Then, the washer liquid 5 is sprayed out to a windshield (not shown) through the orifice 40.

Figure 6:
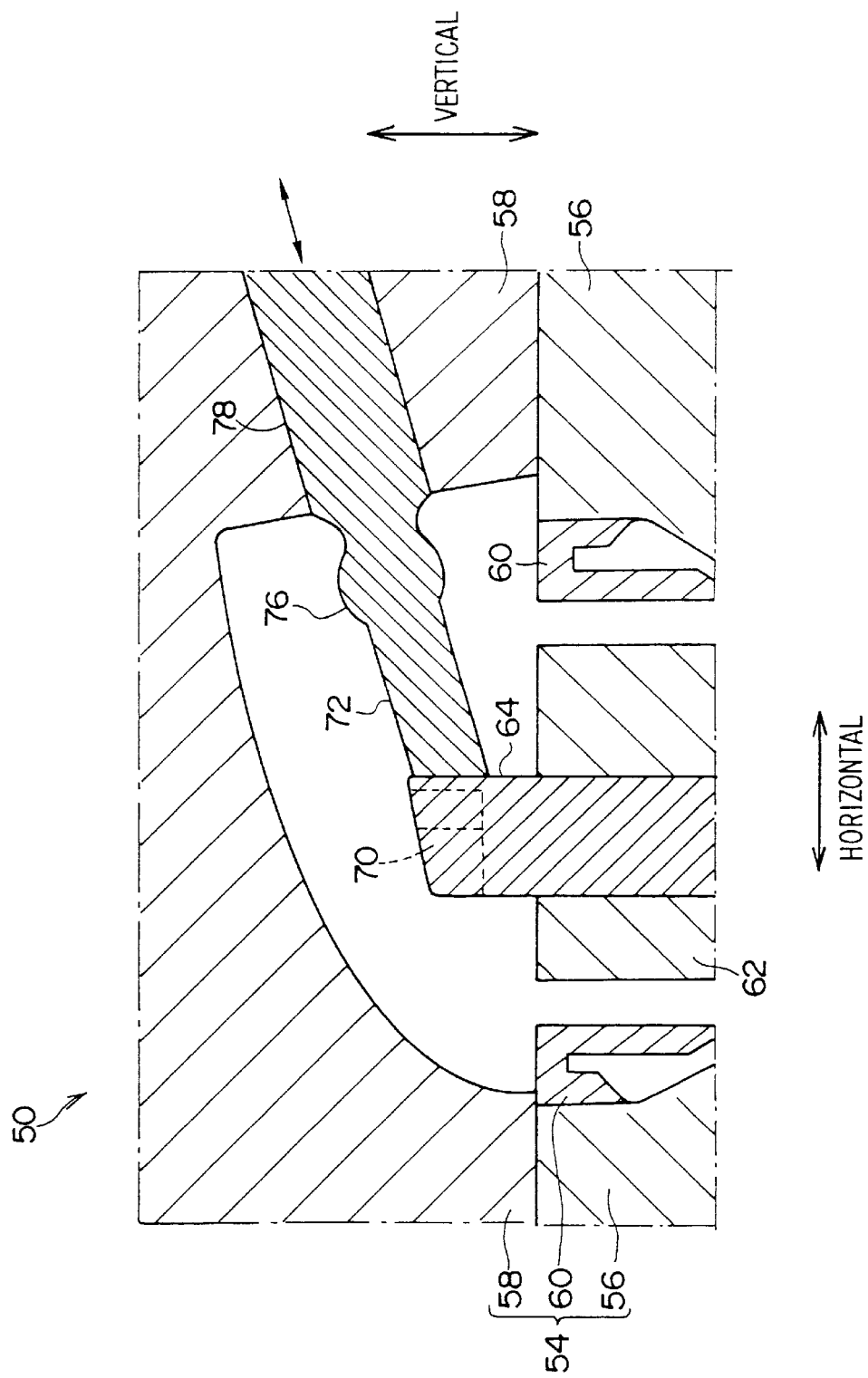
FIG. 6 is a cross-sectional view of a main part of a nozzle molding device for molding the window washer nozzle of the first embodiment.

This window washer nozzle 10 is molded by injecting resin into a molding unit 54 of a nozzle molding device 50 shown in FIG. 6. The molding unit 54 has a cylindrical portion mold 56, a nozzle head mold 58, a space defining mold 60 and the like. The cylindrical portion mold 56 is for forming external forms of the cylindrical portion 12 and hook 14 (except distal ends thereof) and the lower surface of the nozzle head 22. The nozzle head mold 58 is for forming an external form of the nozzle head 22 other than the lower surface. The space defining mold 60 is for forming the distal ends of the hook 40 and to provide spaces surrounded with the cylindrical portion 12, hook 14 and the lower surface of the nozzle head 22.

A core 62 having a substantially columnar shape is positioned inside of the cylindrical portion mold 56 in the molding unit 54. The core 62 forms an inner shape of the cylindrical portion 12. A vertical pin 64 having a substantially columnar shape is positioned in the molding unit 54 to penetrate through the center of the core 62. The bottom end of the vertical pin 64 protrudes downwardly from the bottom surface of the core 62.

Figure 7:
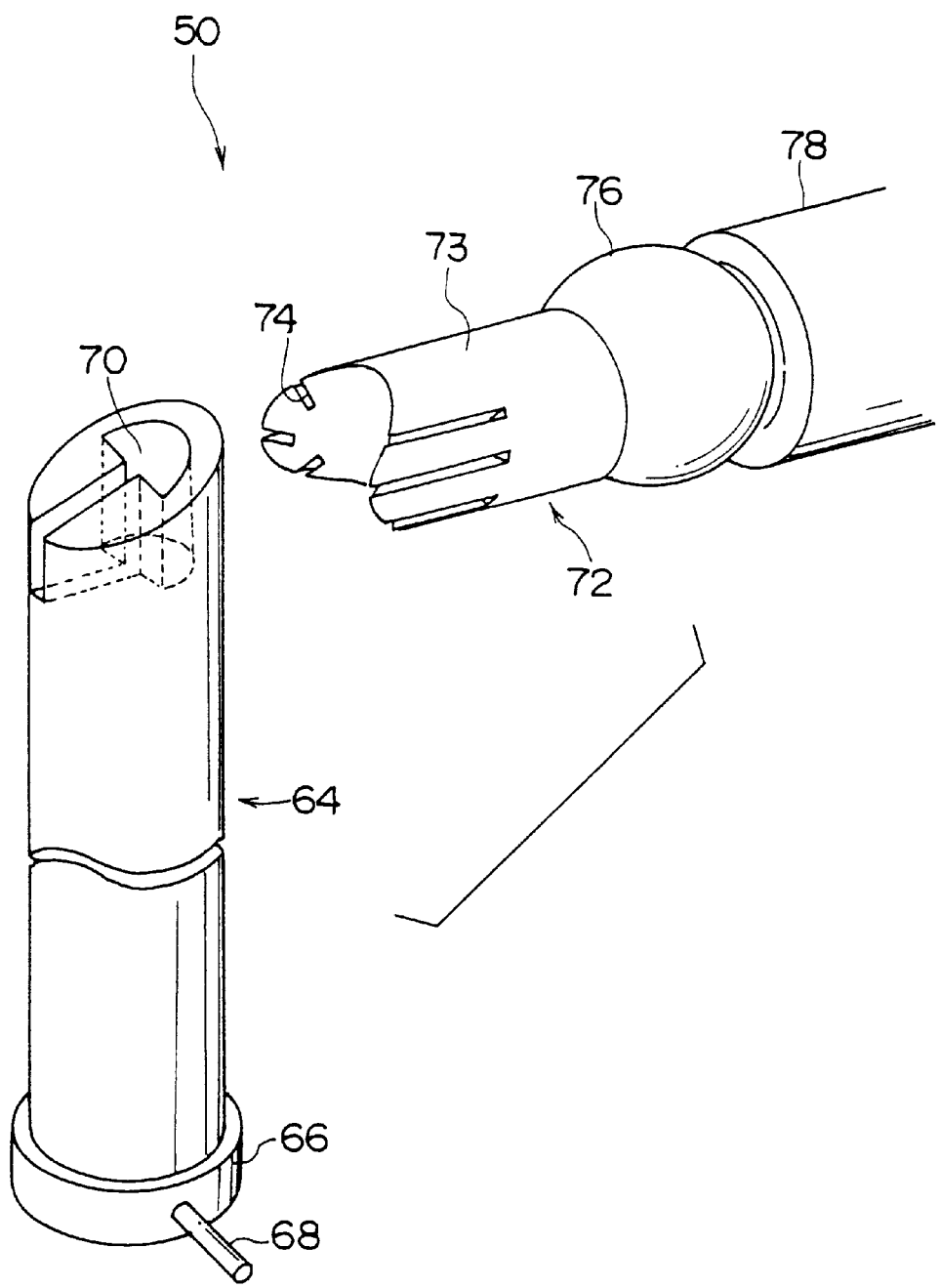
FIG. 7 is a perspective view of a vertical pin and a horizontal pin used in the nozzle molding device according to the first embodiment.

A columnar supporting base 66 is provided on the bottom end of the vertical pin 64, as shown in FIG. 7. A positioning pin 68 is provided on the supporting base 66. A columnar engaging recess (not shown) into which the supporting base 66 is fitted and a plate-like positioning recess (not shown)

into which the positioning pin 68 is fitted are formed on an inner bottom surface of the cylindrical portion mold 56. The engaging recess and the positioning recess are provided to communicate each other. Therefore, the vertical pin 64 is supported in the cylindrical portion mold 56 while a rotation of the vertical pin 64 is restricted.

The vertical pin 64 for forming the vertical liquid pipe 24 protrudes upwardly from the upper end surface of the core 62.

A filter molding portion 70 is formed in the upper end of the vertical pin 64, so that opposed wall 28 and the connecting wall 30 of the filter 26 are molded in the filter molding portion 70.

A substantially columnar horizontal pin 72 is positioned in the molding unit 54. The horizontal pin 72 has a cylindrical portion 73 for forming the horizontal liquid pipe 32 and a holding hole molding portion 76. The axial end surface of the cylindrical portion 73 is curved to fit onto the outer peripheral surface of the vertical pin 64, as shown in FIG. 7. The horizontal pin 72 is arranged in contact with the vertical pin 64 such that the curved axial end surface is opposed to the filter molding portion 70. The predetermined number of current plate molding portion 74 is formed in the cylindrical portion 73 of the horizontal pin 72. The current plates 34 are molded in the current plate molding portion 74.

The holding hole molding portion 76 of the horizontal pin 72 has a substantially spherical shape to form the holding hole 36. Further, a sliding bar 78 is integrated with the holding hole molding portion 76 opposite to the, cylindrical portion 73. The sliding bar 78 is inserted in the nozzle head mold 58. The horizontal pin 72 is slidable with the sliding bar 78 with respect to the nozzle head mold 58.

After injection molding, the window washer nozzle 10 is removed from the molding unit 54 in the following manner. First, the horizontal pin 72 is forcibly pulled out from the nozzle head mold 58 before molded resin is hardened. Then, the nozzle head mold 58 is removed from the cylindrical portion mold 56. Next, the cylindrical portion mold 56 and the space defining mold 60 are moved with respect to the core 62. Finally, the window washer nozzle 10 is pushed out from the core 62 with a push pin (not shown) provided on the cylindrical portion mold 56.

In the window washer nozzle 10 molded as described above, the filter 26 is integrally molded in the liquid pipe at the coupling portion 42. Thus, the washer liquid 5 introduced in the vertical liquid pipe 24 is filtered with the filter 26 before introduced into the horizontal liquid pipe 32. Then, the washer liquid 5 is sprayed out to the windshield from the orifice 40 through the horizontal liquid pipe 32 to wash the windshield.

The dimension L of the space 44 defined between the curved surface 28a of the opposed wall 28 and the inlet 32A of the horizontal liquid pipe 32 is narrower than the bore size W of the orifice 40. Therefore, if foreign materials (e.g. crushed resin pieces and inorganics such as pebbles) are contained in the washer liquid 5 introduced into the nozzle 10, the foreign materials larger than the dimension L are blocked by the filter 26. Only the foreign materials smaller than the dimension L pass through the filter 26 with the washer liquid 5 and reach the orifice 40. Since the foreign materials reached the nozzle 40 are smaller than the bore size W, they can pass through the orifice 40. Accordingly, clogging of the nozzle 40 is restricted.

The filter 26 is provided at the coupling portion 42 of the vertical liquid pipe 24 and the horizontal liquid pipe 32. Therefore, the foreign materials blocked by the filter 26 fall down in the vertical liquid pipe 24 by the gravity force without reaching the horizontal liquid pipe 32. Accordingly, it is restricted that the foreign materials are accumulated at the filter 26, thereby restricting the clogging of the filter 26.

Since the filter 26 is provided near the inlet 32A of the horizontal liquid pipe 32, the washer liquid 5 is filtered at the position where the current direction of the washer liquid 5 is changed from the vertical direction to the horizontal direction. Therefore, pressure applied to the filter 26 by the washer liquid 5 passing therethrough is reduced. Accordingly, the filter 26 properly blocks the foreign materials.

Further, the filter 26 is provided to set the dimension L of the space 44 smaller than the bore size W of the orifice 40. Therefore, the filter 26 is easily provided with the opposed wall 28. The connecting wall 30 is provided to contact the inner peripheral wall of the vertical liquid pipe 24 and a part of the opposed wall 28 other than a part which faces the inlet 32A of the horizontal liquid pipe 32. In a case that the opposed wall 28 is integrally provided with the vertical liquid pipe 24 by resin molding, the connecting wall 30 can restrict the opposed wall 28 from inclining. Therefore, it is restricted that the dimension L of the space 44 is changed. That is, the space 44 is properly provided. Further, since the connecting wall 30 is easily molded, the filter 26 is easily produced.

In addition, large spaces 46 are defined between the inner peripheral wall of the vertical liquid pipe 24 and the connecting wall 30, as shown in FIG. 2B. Therefore, the washer liquid 5 is easily introduced into the space 44 through the spaces 46. Accordingly, it is possible to spray out a large amount of washer liquid 5 from the nozzle 40 through the horizontal liquid pipe 32.

In the molding unit 54 of the nozzle molding device 50, the horizontal pin 72 is arranged in contact with the vertical pin 64 such that the axial end of the horizontal pin 64 forming the inlet 32A is opposite to the filter molding portion 70 formed in the upper end of the vertical pin 64. Accordingly, the filter 26 is integrally molded with the nozzle head 22 at the coupling portion 42 of the vertical liquid pipe 24 and the horizontal liquid pipe 32. In this way, the window washer nozzle 10 having the filter 26 is molded in this simple molding unit 54. Further, this vertical pin 64 having the filter molding portion 70 is used for other nozzle molding device.

Since the horizontal pin 72 is slidablly arranged on the outer peripheral surface of the vertical pin 64 with respect to the molding unit 54, the horizontal pin 72 can be removed from the molding unit 54 after molding. Therefore, it is possible to arrange the plurality of horizontal pins 72 around the same vertical pin 64 and to mold the plurality of filters 26 at the coupling portions 42. Accordingly, the plurality of horizontal liquid pipes 32 is coupled to the single vertical liquid pipe 24. Thus, it is possible to provide the plurality of orifices 40 in the window washer nozzle 10.

Hereinafter, the window washer nozzle of this embodiment is demonstrated by way of some examples.

EXAMPLE 1

Washer liquid is pumped under 118 kpa for ten minutes in the nozzle 10 of the first embodiment and a comparison window washer nozzle (not shown) without having the filter 26. The discharge amount (flowing amount) of the washer liquid is measured in each case and compared. A diameter of the vertical liquid pipe is 3 mm in the nozzle 10 and the comparison nozzle.

Firstly, in a case that the nozzle jet 38 is not mounted at the outlet of the horizontal liquid pipe, the discharge amount of the washer liquid is 236 cc in the comparison nozzle. In the nozzle 10 of the first embodiment, when the dimension L of the space 44 is 0.46 mm the discharge amount is 212 cc. When the dimension L is 0.3 mm, the discharge amount is 191 cc. When the dimension L is 0.2 mm, the discharge amount is 164 cc.

Next, in a case that the nozzle jet 38 is mounted at the outlet of the horizontal liquid pipe, the discharge amount of the washer liquid in the comparison nozzle is 112 cc. In the nozzle 10 of the first embodiment, when the dimension L of the space 44 is 0.46 mm, the discharge amount is 109 cc. When the dimension L is 0.3 mm, the discharge amount is 104 cc. When the dimension L is 0.2 mm, the discharge amount is 100 cc.

According to the above comparison, a sufficient discharge amount is ensured in the nozzle 10 irrespective of the dimension L of the space 44. Therefore, the discharge amount of the washer liquid is not affected due to the filter 26. It is possible to increase the diameter of the vertical liquid pipe 24 irrespective of the diameter of the nozzle jet 38, while the diameter of the horizontal liquid pipe 32 is needed to be smaller than the diameter of the holding hole 36 (nozzle jet 38) in order to restrict the nozzle jet 38 from entering the horizontal liquid pipe 32.

EXAMPLE 2

Washer liquid jet performance of the window washer nozzle 10 of the first embodiment is compared between when the foreign materials are not added in the washer liquid and when the foreign materials are added. As the foreign materials, the crushed resin pieces, pebbles and the like in a size range of 05. mm×1 mm to 1 mm×1.5 mm are added five in total in the washer liquid. As a result, a jet state (spray state) of the washer liquid and jet power of the washer liquid are similar in two cases, in the window washer nozzle 10. Also, the discharge amount of the washer liquid in the case that the foreign materials are not added is 109 cc. The discharge amount in the case that the foreign materials are added is 102 cc. Accordingly, the discharge amount of the washer liquid can be sufficiently obtained while the foreign materials are blocked.

Second Embodiment

Figure 8:
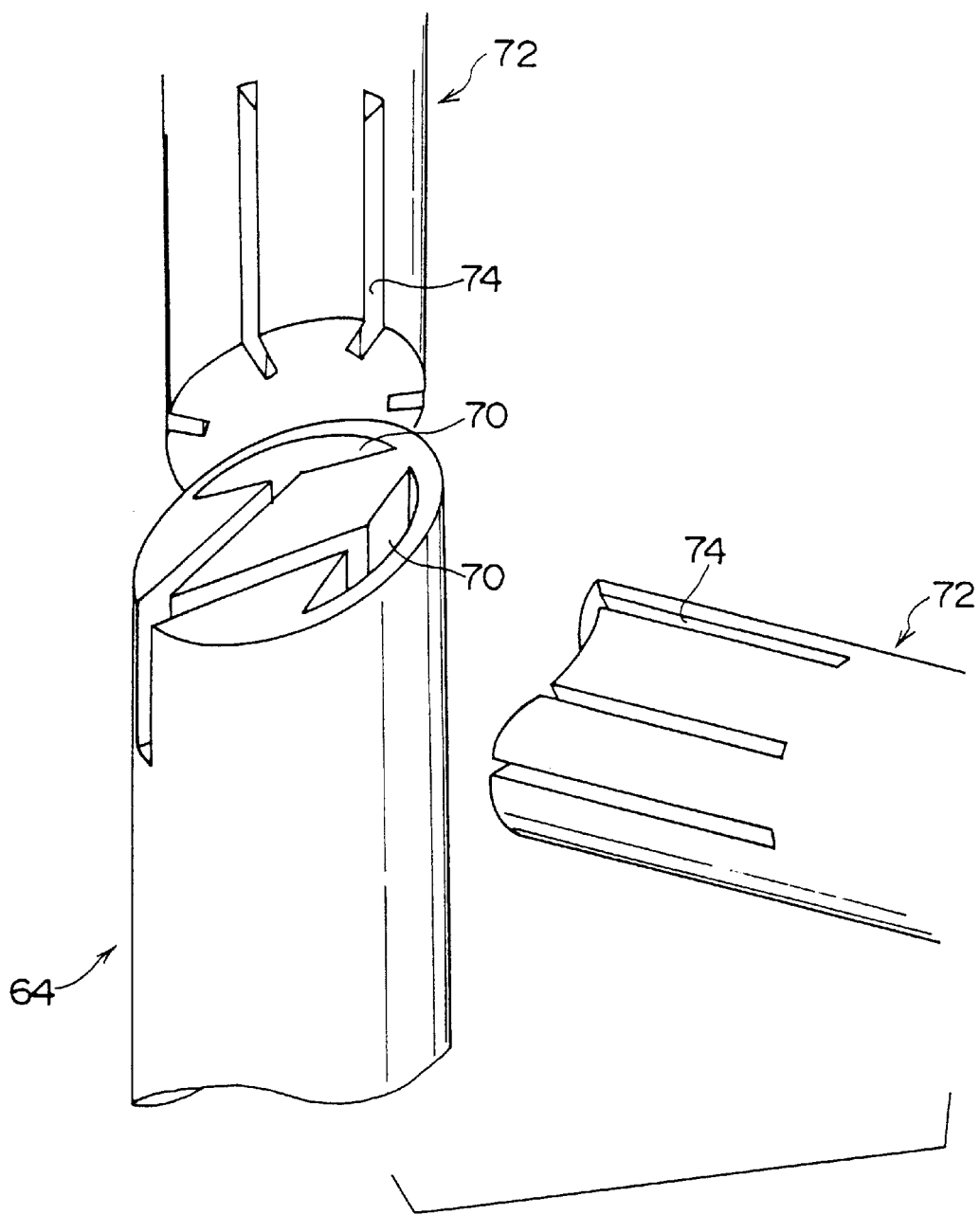
FIG. 8 is a perspective view of a vertical pin and horizontal pins used in the nozzle molding device according to the second embodiment.

In the second embodiment, the vertical pin 64 has a plurality of filter molding portions 70 in the upper end thereof and the plurality of horizontal pins 72 is arranged to correspond to the filter molding portions 70 in the molding unit 54, respectively. Here, the filter molding portion 70 has similar shape to that of the first embodiment. For example, two filter molding portions 70 are provided in the vertical pin 64 and two horizontal pins 72 are arranged in FIG. 8. The axial end surface of each horizontal pin 72 is fitted onto the outer peripheral surface of the vertical pin 64 to oppose to each filter molding portion 70. Each horizontal pin 72 has the sliding bar 78 and is slidablly inserted in the nozzle head mold 58.

With this arrangement, the plurality of filters 26 is integrally molded with the nozzle head 22 at the upper end of the vertical liquid pipe 24. Further, the plurality of horizontal liquid pipes 32 is formed in the nozzle head 22 corresponding to the plurality of filters 26. In the second embodiment, advantages similar to those of the first embodiment are provided.

Since the plurality of horizontal pins 72 is arranged in contact with the outer peripheral surface of the single vertical pin 64, the plurality of horizontal liquid pipes 32 is formed and each of the filters 26 is molded at each coupling portion 42. Therefore, it is possible to provide the window washer nozzle having filters 26 in which the plurality of orifices 40 is provided, with the single vertical pin 64.

The plurality of filters 26 is provided to correspond to each of the horizontal liquid pipe 32. However, it is not always necessary to provide the filters 26 to all of the horizontal liquid pipes 32. For example, the predetermined number of horizontal pins 72 can be arranged on the outer peripheral surface of the vertical pin 64 to correspond to one filter molding portion 70. That is, one filter 26 can be used for the plurality of the horizontal liquid pipes 64.

As another example, the additional horizontal pin 72 can be provided to fit on the outer peripheral surface of the horizontal pin 72 that is located to correspond to the filter 26. Also with this arrangement, it is possible to provide the window washer nozzle having the filter 26 in which the plurality of orifices 40 is provided with the single vertical pin 64. Although it is described that the opposed wall 28 of the filter 26 is in the semi-columnar shape having the circumferential angle of 180 degree, the circumferential degree of the opposed wall 28 can be changed as long as the filter 26 functions as a filter. For example, the opposed wall 28 can be formed into a columnar shape.

Third Embodiment

Figure 9:
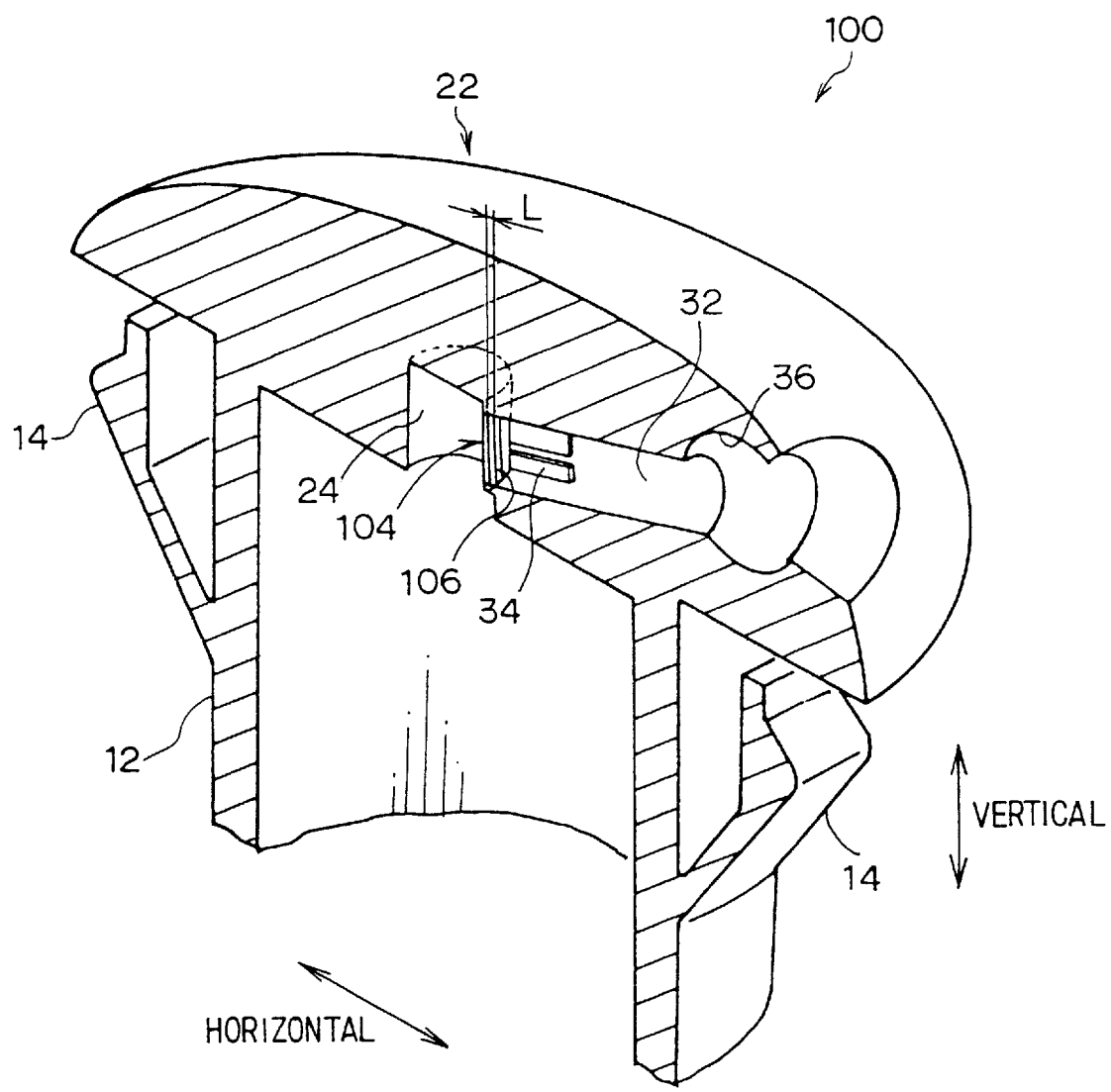
FIG. 9 is a perspective view of a window washer nozzle cut in half, according to the third embodiment.

In a window washer nozzle 100 of the third embodiment, a shape of a filter is different from the filter 26 of the first and the second embodiments. Referring to FIG. 9, a substantially disc-shaped filter 104 is integrally molded with the nozzle head 22 at the coupling portion of the vertical liquid pipe 24 and the horizontal liquid pipe 32, in place of the filter 26 having the opposed wall 28 and the connecting wall 30. The filter 104 is formed with the predetermined number of filter slits 106. Each of the filter slits 106 is in a rectangle and extends in the substantially vertical direction. Also in this embodiment, a dimension L of each filter slit 106 through which the washer liquid 5 flows into the horizontal liquid pipe 32 is smaller than the bore size W of the orifice 40 to block the foreign materials larger than the bore size W.

Figure 10:
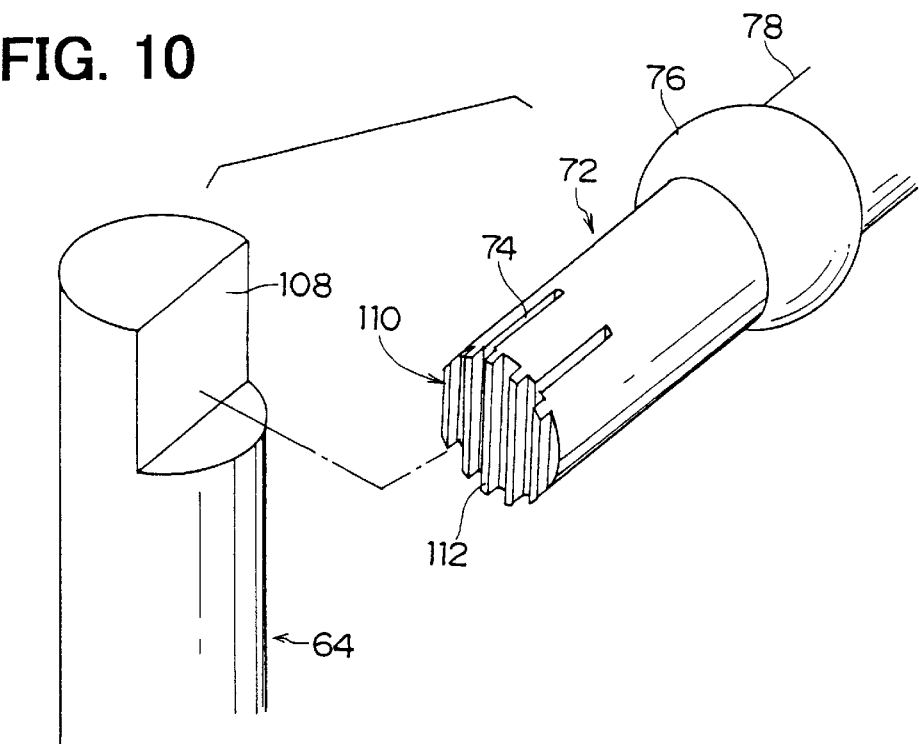
FIG. 10 is a perspective view of a vertical pin and a horizontal pin used in the nozzle molding device according to the third embodiment.
Figure 11:
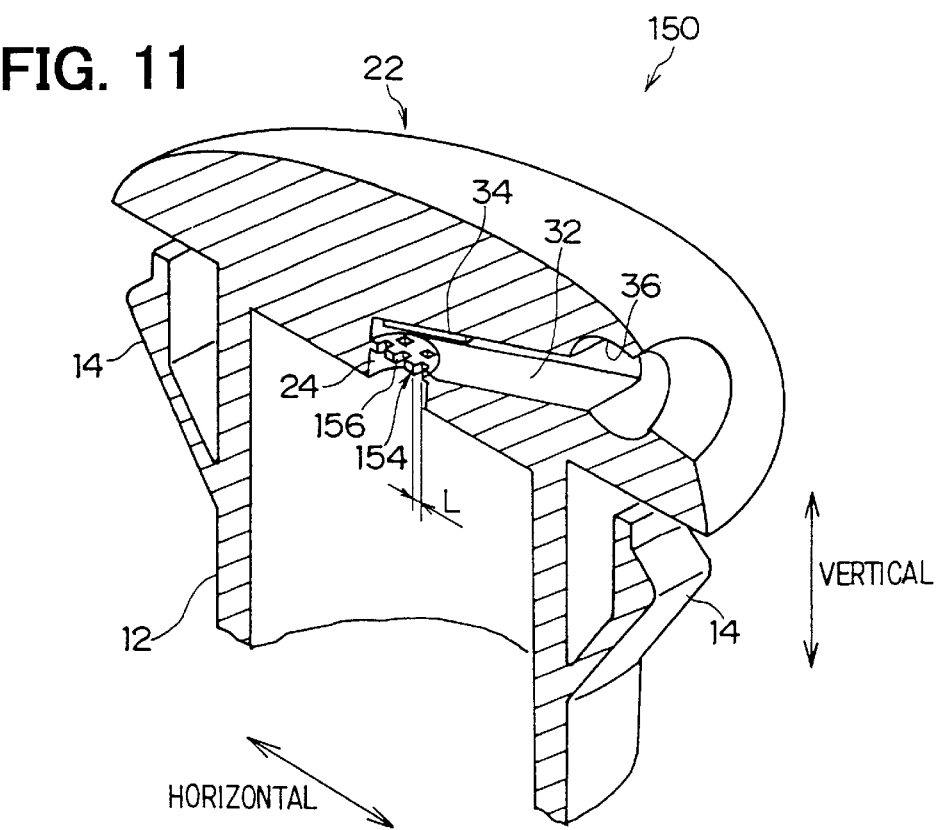
FIG. 11 is a perspective view of a window washer nozzle cut in half, according to the fourth embodiment.

In order to integrally mold the window washer nozzle 100, the vertical pin 64 does not have the filter molding portion 70 at the upper end, but has a flat surface 108 on the outer periphery of the upper end, as shown in FIG. 10. The horizontal pin 72 has a filter molding portion 110 on its axial end surface. The filter molding portion 110 has a predetermined number of filter molding pillars 112 in a rectangular parallelopiped-shape extending substantially in the vertical direction. The filter molding portion 110 is arranged in contact with the flat surface 108 of the vertical pin 64 in the nozzle molding device of the third embodiment. Therefore, the filter slits 106 of the filter 104 are molded by the filter molding pillar 112 of the filter molding portion 110.

In the third embodiment, advantages similar to the first and the second embodiments are provided. In addition, it is possible to provide the plurality of horizontal liquid pipes 32 on the outer periphery of the vertical liquid pipe 24. In this case, a plurality of flat surfaces 108 is provided on the outer peripheral surface of the upper end of the vertical pin 64. The plurality of horizontal pins 72 is positioned such that each filter molding portion 110 is fitted on each of the flat surfaces 108. As another example, the filter molding portion 110 of one horizontal pin 72 is fitted on the flat surface 108 of the vertical pin 64 and the axial end surface of an additional horizontal pin 72 can be fitted on the peripheral surface of the horizontal pin 72 fitted on the vertical pin 64. Here, it is not always necessary that the additional horizontal pin 72 has the filter molding portion 110. With these arrangements, advantages similar to that of the second embodiment can be provided.

Although it is described that the filter slits 106 of the filter 104 are provided to extend in the vertical direction, the filter slits 106 can be provided to extend in any directions. In this case, the extending direction of the filter pillars of the filter molding portion 110 can be changed in accordance with the arrangement of the filter slits 106. In addition, the filter slits 106 of the filter 104 are provided in the rectangular shape. However, the filter slits 106 can be provided in any other shapes such as circle and polygon. With this, the filter molding pillars can be changed in any other shapes.

Fourth Embodiment

In a window washer nozzle 150 of the fourth embodiment, a shape of a filter is different from those of the first to the third embodiments. A substantially disc-shaped filter 154 is integrally molded with the nozzle head 22 in a coupling portion 42 of the vertical liquid pipe 24 and the horizontal liquid pipe 32.

The filter 154 is provided with a predetermined number of meshes 156. Here, each of the meshes 156 has a rectangular shape, and each dimension (size) L of the meshes 156 is smaller than the bore size W of the orifices 40 to block the foreign materials larger than the bore size W. The horizontal liquid pipe 32 has a rectangular shape in cross section and is coupled to the upper end surface of the vertical liquid pipe 24.

Figure 12:
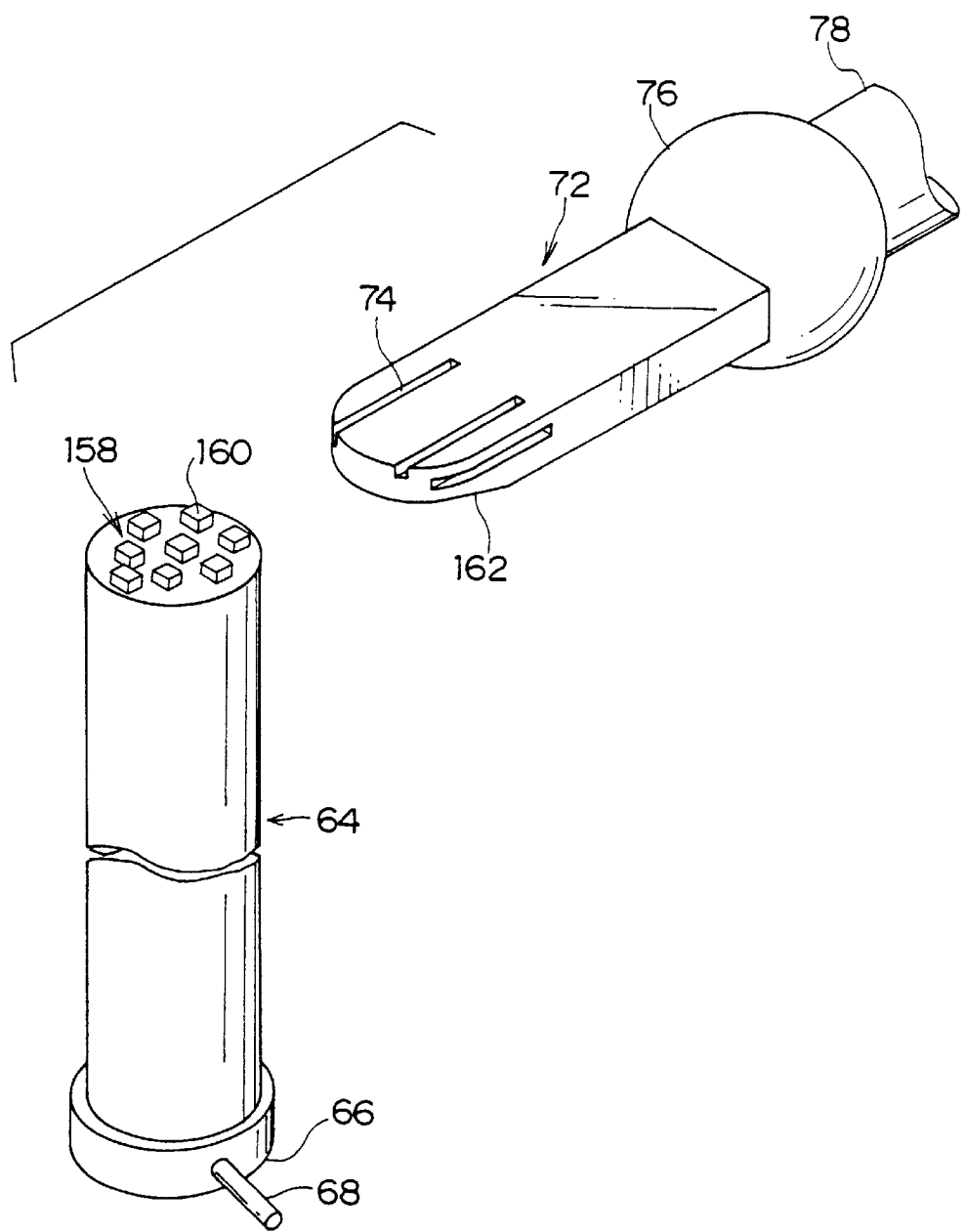
FIG. 12 is a perspective view of a vertical pin and a horizontal pin used in the nozzle molding device according to the fourth embodiment.

This filter 154 is molded by the vertical pin 64 and the horizontal pins 72 shown in FIG. 12. Here, the above-described filter molding portion 70 is not provided in the upper end of the vertical pin 64, but a filter molding portion 158 is provided on the upper end surface of the vertical pin 64. The filter molding portion 158 has a predetermined number of filter molding pillars 160 each of which is formed into the rectangular parallelopiped shape. Further, the axial end of the horizontal pin 72 for molding the horizontal liquid pipe 32 has a rectangular shape in cross section, and the lower surface of the axial end of the horizontal pin 72 is cut out to provide a plane surface 162. The horizontal pin 72 and the vertical pin 64 are arranged in the nozzle molding device such that the plane surface 162 is fitted on the filter molding portion 158. Therefore, the meshes 156 of the filter 154 are formed by the filter molding pillars 160 of the filter molding portion 158. In the fourth embodiment, advantages similar to those of the first to the third embodiments are provided.

A plurality of horizontal liquid pipes 32 can be provided on the vertical liquid pipe 24. In this case, the plane surface 162 is provided only on the horizontal pin 72 that is fitted on the filter molding portion 158. The additional horizontal pins 72 are arranged to fit on the outer peripheral surface of the horizontal pin 72. With this arrangement, advantages similar to those of the other embodiments can be provided.

Although the filter meshes 156 of the filter 154 are provided in the rectangular shape, the filter meshes 156 can have any other shapes such as circular and polygonal. Therefore, the filter molding pillars 160 can have any other shapes.

In the above described embodiments, the filters are integrally molded at the bent portion of the liquid pipe, that is, at the coupling portion 42. These filters are molded by positioning the horizontal pin and the vertical pin in contact with each other in the molding device. Therefore, it is possible to use these horizontal pin and vertical pin in the other nozzle molding device having a similar structure. Further, the shape of the filters can be changed easily by changing those pins. Also, the number of the horizontal liquid pipes can be changed by changing the number of the horizontal pins.

The present invention should not be limited to the disclosed embodiments, but may be implemented in other ways without departing from the spirit of the invention.

What is claimed is:

1. A window washer nozzle for spraying out washer liquid for washing a windshield comprising:

a first liquid pipe extending substantially in a vertical direction;

a second liquid pipe extending in a direction to cross with the first liquid pipe, the second liquid pipe having a first end defining an inlet of the second liquid pipe and being coupled to the first liquid pipe, and a second end defining a jet orifice from which the washer liquid sprays out toward the windshield;

a filter provided in a coupling portion where the first liquid pipe and the second liquid pipe are coupled to each other, to define a space L through which the washer liquid flows into the second liquid pipe from the first liquid pipe, the space L being smaller than an orifice dimension W of the jet orifice.

2. The window washer nozzle according to claim 1, wherein the filter is disposed in such a manner that the washer liquid passes through the filter at a position where a flow direction of the washer liquid is changed from the substantially vertical direction to a longitudinal direction of the second liquid pipe.

3. The window washer nozzle according to claim 1, wherein the filter has an opposed wall that is opposite to the inlet of the second liquid pipe with the space L.

4. The window washer nozzle according to claim 3, wherein the filter has a connecting wall that is in contact with an inner peripheral wall of the first liquid pipe and the opposed wall other than a part opposite to the inlet of the second liquid pipe.

5. The window washer nozzle according to claim 1, wherein a check valve is provided at an upstream side of the first liquid pipe to restrict an air from being drawn into the window washer nozzle from the jet orifice during a halt of washer liquid spraying.

6. The window washer nozzle according to claim 1, wherein the filter is integrated with at least one of the first liquid pipe and the second liquid pipe.

7. The window washer nozzle according to claim 6, wherein the filter has mesh.

8. The window washer nozzle according to claim 1, wherein the second liquid pipe is coupled to an upper end of the first liquid pipe.

9. The window washer nozzle according to claim 1, wherein the second liquid pipe extends substantially in a horizontal direction.

10. The window washer nozzle according to claim 9, wherein the second liquid pipe is disposed to be slightly tilted relative to the horizontal direction by an angle smaller than a predetermined angle, upwardly from the first end to the second end.

11. The window washer nozzle according to claim 1, wherein the filter is provided at an upper end of the first liquid pipe such that the washer liquid passes through the filter before being introduced into the second liquid pipe.

12. A window washer apparatus for washing a windshield of a vehicle comprising:

a tank storing washer liquid;

a window washer nozzle for spraying out the washer liquid to the windshield;

a tube connecting the window washer nozzle and the tank; and a pump provided in the tank for pumping the washer liquid to the window washer nozzle through the tube, wherein the nozzle includes:

a first liquid pipe extending substantially in a vertical direction;

a second liquid pipe having a first end and a second end opposite to each other, the first end defining an inlet of the second liquid pipe and being coupled to the first liquid pipe in a direction crossing to the first liquid pipe and the second end defining a jet orifice from which the washer liquid sprays out toward the windshield, and a filter provided at a position where the first liquid pipe and the second liquid pipe are coupled to each other to define a space L through which the washer liquid flows into the second liquid pipe from the first liquid pipe, the space L being smaller than an orifice dimension W of the jet orifice.

13. The window washer apparatus according to claim 12, wherein the filter is disposed such that the washer liquid flows into the second liquid pipe from the first liquid pipe after passing through the filter.

14. The window washer apparatus according to claim 12, wherein the filter is positioned at a part where a flow direction of the washer liquid is changed from the vertical direction into a longitudinal direction of the second liquid pipe.

15. The window washer apparatus according to claim 12, wherein the filter has an opposed wall that is opposite to the inlet of the second liquid pipe with the space L.

16. The window washer apparatus according to claim 15, wherein the filter has a connecting wall that is in contact with an inner wall of the first liquid pipe and the opposed wall other than a part opposite to the inlet of the second liquid pipe.

17. The window washer apparatus according to claim 12, wherein a check valve is provided at an upstream side of the first liquid pipe to restrict an air from being drawn into the window washer nozzle from the orifice during a halt of washer liquid spraying.

18. The window washer device according to claim 12, wherein the filter is integrated with at least one of the first liquid pipe and the second liquid pipe.

19. The window washer device according to claim 18, wherein the filter has mesh.

20. The window washer apparatus according to claim 12, wherein the second pipe is coupled to an upper end of the first pipe.

21. A window washer nozzle spraying out washer liquid from an orifice to wash a windshield comprising:

a liquid pipe bent to have a first liquid pipe and a second liquid pipe, the first liquid pipe being extended in a gravitational direction, and the second liquid pipe being extended in a direction crossing to the gravitational direction and defining the orifice at an end from which the washer liquid is sprayed out; and a filter provided in the liquid pipe at a part where the liquid pipe is bent to define a space through which the washer liquid flows into the second liquid pipe from the first liquid pipe, the space being narrower than the orifice.

* * * * *